United States Patent [19]

Penny et al.

[11] Patent Number: 5,009,797

[45] Date of Patent: Apr. 23, 1991

[54] METHOD OF SUPPORTING FRACTURES IN GEOLOGIC FORMATIONS AND HYDRAULIC FLUID COMPOSITION FOR SAME

[75] Inventors: Glenn S. Penny, Duncan, Okla.; Robert S. Stephens, Auburn; Alan R. Winslow, Tacoma, both of Wash.

[73] Assignee: Weyerhaeuser Company, Tacoma, Wash.

[21] Appl. No.: 450,360

[22] Filed: Dec. 13, 1989

[51] Int. Cl.$^5$ ............................................. E21B 43/26
[52] U.S. Cl. .................... 252/8.551; 166/308; 435/101; 435/823; 536/123
[58] Field of Search ............ 252/8.551; 166/308; 435/101, 823; 530/123

[56] References Cited

U.S. PATENT DOCUMENTS

| | | | |
|---|---|---|---|
| Re. 32,302 | 12/1986 | Almond et al. | 166/308 |
| 3,760,881 | 9/1973 | Kiel | 166/308 |
| 3,979,303 | 9/1976 | Kang et al. | 252/8.551 X |
| 4,067,389 | 1/1978 | Savins | 166/308 X |
| 4,137,400 | 1/1979 | Demartino et al. | 252/8.551 X |
| 4,250,044 | 2/1981 | Hinkel | 252/8.551 |
| 4,336,145 | 6/1982 | Briscoe | 252/8.551 |
| 4,442,897 | 4/1984 | Crowell | 166/308 X |
| 4,507,210 | 3/1985 | Lavzon | 252/8.511 |
| 4,514,563 | 4/1985 | Fujiyama et al. | 536/123 |
| 4,575,551 | 3/1986 | Fujiyama et al. | 536/123 |
| 4,604,217 | 8/1986 | Lukach et al. | 252/8.551 |
| 4,863,565 | 9/1989 | Johnson et al. | 162/150 |

OTHER PUBLICATIONS

*The Petroleum Engineering Handbook*, H. B. Bradley, Ed., Society of Petroleum Engineers, Richardson, Tex., Chap. 55, (1987).

*Chemicals in Petroleum Exploration and Production II, North American Report and Forecasts to 1993*, Colin A. Houston and Associates, Inc., Mamaroneck, N.Y., (1984).

*Primary Examiner*—Robert L. Stoll
*Assistant Examiner*—Chhaya Sayala

[57] ABSTRACT

The invention relates to hydraulic fracturing of geological formations at selected levels of wells drilled for recovery of hydrocarbons. It resides in the addition of relatively small quantities of a bacterial cellulose to hydraulic fracturing fluids to improve their rheological properties. Proppant suspension is markedly improved and friction loss through well casings is significantly reduced, resulting in lower pumping energy requirements. Computer models also indicate that formation fractures will also be propagated for greater distances as will the propped portion of the fracture. Normally only about 5–15 lb of bacterial cellulose per 1000 gallons (0.60–1.8 g/L) of fracturing fluid is needed. A preferred bacterial cellulose is one made in agitated fermenters using mutation resistant strains of a bacterium from the genus Acetobacter.

19 Claims, No Drawings

METHOD OF SUPPORTING FRACTURES IN GEOLOGIC FORMATIONS AND HYDRAULIC FLUID COMPOSITION FOR SAME

BACKGROUND OF THE INVENTION

The present invention deals with fracturing geologic formations in the region of hydrocarbon bearing zones in order to stimulate production. More specifically, it deals with an improved hydraulic fracturing fluid which has improved rheological properties for delivering a proppant into fractures in order to maintain them in a highly permeable condition for improved hydrocarbon recovery. The invention further relates to the method of preparation and use of the fluid.

Hydraulic fracturing of oil bearing formations has been practiced commercially since 1948. This involves pumping a fluid at a sufficiently high pressure and volumetric rate into the hydrocarbon bearing zone to cause cracks to form and propagate. A granular solid material usually termed a proppant is carried along with the fluid so that it wedges in the thus formed cracks and maintains them in an open condition after the pressure is released. This can greatly increase the permeability, especially of very tight formations, and enables much higher flow rates and greater recovery of the contained hydrocarbons.

At the present, hydraulic fracturing has become a largely predictable practice so that orientation and lengths of cracks can be predetermined and even controlled to a great extent.

Both oil based and water based fracturing fluids are employed, although the latter type is by far the more common. The present invention is directed to water based types and the following discussion is specific to this type.

Fracturing fluids usually contain a number of ingredients. The most important are the gellant, which controls rheological properties, and the proppant. The gellant must maintain the proppant in suspension during fluid preparation, pumping, and ultimate distribution into the cracks in the hydrocarbon bearing formation. In order to do this effectively it must be compatible with a number of greatly differing shear conditions. It is not uncommon for several hundred thousand gallons of fracturing fluid to be injected into a well at pumping rates as high as 50 barrels (42 gal/bbl) per minute. Ideally viscosity should be low when mixing and pumping in order to minimize pumping energy required. However, it must be high enough so that the proppant does not fall out of suspension until it is ultimately delivered to its desired location. Viscosity reduction due to high temperatures in the hydrocarbon bearing zone can further complicate the picture.

In order to accommodate the above conflicting viscosity requirements the gellant will normally convey thixotropic properties to the fracturing fluid. The higher viscosity at lower shear rates will help maintain the proppant in suspension while the lower viscosity experienced at higher shear conditions will improve flow rate and proppant transport conditions. Very typically a crosslinking agent will be used to cause a significant viscosity increase in the region of the bottom of the hole, after the fluid has passed through the great bulk of the well casing.

Ultimately, it is necessary to remove the transport fluid after the proppant is in place in the fractures. There are a number of ways of accomplishing this end but the use of oxidizing agents and enzymes that attack the gellant are most common.

Two references might be cited that give a general background of hydrofracturing. The Petroleum Engineering Handbook, H. B. Bradley, ed., Society of Petroleum Engineers, Richardson, Tex. Chap. 55 (1987) has a very useful general discussion. Specific chemicals used in fracturing fluids are covered in more detail in Chemicals in Petroleum Exploration and Production II, North American Report and Forecasts to 1993, Colin A. Houston and Associates, Inc., Mamaroneck, N.Y. (1984).

While the term "gellant" is in common use and will be used herein it should not be taken literally in the sense that these materials form a conventional nonflowing gel. More appropriately they should be regarded as viscosifiers and rheology control agents. Gellants are most usually based on water soluble derivatives of natural polysaccharide materials such as guar gum, cellulose, or xanthan. Most common of these materials is hydroxypropyl guar. Carboxymethylhydroxypropyl guar is another commonly used guar derivative. Among the cellulosics to be mentioned are hydroxyethyl cellulose, carboxymethylhydroxyethyl cellulose and hydroxypropylmethyl cellulose. Down hole temperature will have an important influence on the gellant chosen. Hydroxypropyl guar is useful at lower temperatures and carboxymethylhydroxyethyl cellulose at higher temperatures. Hydroxyethyl cellulose and xanthan have maximum upper temperature tolerance somewhat between these two.

As was noted earlier, crosslinkers are typically used to increase down hole viscosity. Most commonly these are polyvalent metal salts that form chelates; e.g., borates, aluminates, titanates, chromates, zirconates, etc.

Temperature determines the gelbreaking mechanism chosen after the proppant has been delivered. Enzymes are useful up to 50° C. and oxidants such as calcium or sodium hypochlorite and sodium or ammonium persulfate to about 80° C. Heat alone will usually suffice to break the gels by thermal degradation at temperatures above about 135° C.

Proppants are chosen from natural silica sand, usually a material having high roundness in the 10–20 to 20–40 mesh size ranges, and synthetics based on alumina. The latter is preferred when compressive forces will be very high.

Despite 40 years of history and research the ideal rheological characteristics of hydraulic fracturing fluids still can only rarely be obtained. The present invention marks a major step forward in rheological control.

SUMMARY OF THE INVENTION

It has been discovered that a dispersed bacterially generated cellulose conveys very advantageous properties to hydraulic fracturing fluids when used in combination with conventional gellants. In particular, higher viscosities can be achieved without resulting increase of friction under flow conditions. Most especially, proppant settling rate is very significantly reduced even at equivalent viscosities to those achieved using only conventional gellants. These improvements are achieved using only small amounts of the bacterial cellulose; e.g., in the range of 1–40 lb/1000 gal (0.12–4.8 g/L) of mixed fluid medium. More typical usage is in the range of about 5–15 lb/1000 gal (0.60–1.8 g/L) of mixed fluid fracturing medium. The bacterial cellulose may be used with conventional gellants including but not limited to guar, hydroxypropyl guar, carboxymethylhydroxypropyl guar, xanthan, hydroxyethyl cellulose, carboxymethylhydroxyethyl cellulose, and hydroxypropylmethyl cellulose. The usual gellants are present in amounts of about 5–60 lb/1000 gal (0.60–7.2 g/L), more commonly about 20–50 lb/1000 gal (2.4–6.0 g/L), of mixed fracturing fluid medium. Proppant will be used in amounts of about 1–8 lb/gal (120–960 g/L).

Bacterial cellulose is a material produced especially by various species of Acetobacter organisms. It differs from plant cellulose by being essentially a fibrillar material of very high surface area. It has very different properties in this regard from purified plant produced celluloses; e.g., wood pulps, that have been heavily refined to the maximum possible extent. Most preferably the bacterial cellulose is one that has been produced in an agitated culture by a strain of the Acetobacter bacterium resistant to mutation to noncellulose producing types under these culturing conditions.

It is an object of the present invention to provide a novel hydraulic fracturing fluid containing a bacterial cellulose to control the rheological properties.

It is a further object to provide a hydraulic fracturing fluid with rheological properties that greatly reduce the tendency for proppant particles to settle out.

It is another object to provide method of preparing a hydraulic fracturing fluid containing a bacterial cellulose.

It is yet an object to provide a method of fracturing a geological formation using a hydraulic fluid containing a bacterial cellulose having improved fracturing and proppant transport properties.

These and many other objects will become readily apparent upon reading the following detailed description.

DESCRIPTION OF THE PREFERRED EMBODIMENTS

It has been known for many years that cellulose can be synthesized by certain bacteria, particularly those of the genus Acetobacter. However, taxonomists have been unable to agree upon a consistent classification of the cellulose producing species of Acetobacter. For example, the cellulose producing microorganisms listed in the 15th Edition of the Catalog of the American Type Culture Collection under accession numbers 10245, 10821 and 23769 are classified both as *Acetobacter aceti* subsp. *xylinum* and as *Acetobacter pasteurianus*. For the purposes of the present invention any species or variety of bacterium within the genus Acetobacter that will produce cellulose should be regarded as a suitable cellulose producer for the purposes of the present invention.

EXAMPLE 1

Production of Bacterial Cellulose

The bacterial cellulose of the present invention was produced in agitated culture by a strain of *Acetobacter aceti* subsp. *xylinum* grown as a subculture of ATCC Accession No. 53263, deposited Sept. 13, 1985 under the terms of the Budapest Treaty.

The following base medium was used for all cultures. This will be referred to henceforth as CSL medium.

| Ingredient | Final Conc. (mM) |
| --- | --- |
| $(NH_4)_2SO_4$ | 25 |
| $KH_2PO_4$ | 7.3 |
| $MgSO_4$ | 1.0 |
| $FeSO_4$ | 0.013 |
| $CaCl_2$ | 0.10 |
| $Na_2MoO_4$ | 0.001 |
| $ZnSO_4$ | 0.006 |
| $MnSO_4$ | 0.006 |
| $CuSO_4$ | 0.0002 |
| Vitamin mix | 10 mL/L |
| Carbon source | As later specified |
| Corn Steep liquor | As later specified |
| Antifoam | 0.01% v/v |

The final pH of the medium was 5.0+0.2.
The vitamin mix was formulated as follows:

| Ingredient | Conc. mg/L |
| --- | --- |
| Inositol | 200 |
| Niacin | 40 |
| Pyridoxine HCl | 40 |
| Thiamine HCl | 40 |
| Ca Pantothenate | 20 |
| Riboflavin | 20 |
| p-Aminobenzoic acid | 20 |
| Folic acid | 0.2 |
| Biotin | 0.2 |

Corn steep liquor (CSL) varies in composition depending on the supplier and mode of treatment. A product obtained as Lot E804 from Corn Products Unit, CPC North America, Stockton, Calif. may be considered typical and is described as follows:

| Major Component | % |
| --- | --- |
| Solids | 43.8 |
| Crude protein | 18.4 |
| Fat | 0.5 |
| Crude fiber | 0.1 |
| Ash | 6.9 |
| Calcium | 0.02 |
| Phosphorous | 1.3 |
| Nitrogen-free extract | 17.8 |
| Non-protein nitrogen | 1.4 |
| NaCl | 0.5 |
| Potassium | 1.8 |
| Reducing sugars (as dextrose) | 2.9 |
| Starch | 1.6 |

The pH of the above is about 4.5.

The bacteria were first multiplied as a pre-seed culture using CSL medium with 4% (w/v) glucose as the carbon source and 5% (w/v) CSL. Cultures were grown in 100 mL of the medium in a 750 mL Falcon #3028 tissue culture flask at 30° C. for 48 hours. The entire contents of the culture flask was blended and used to make a 5% (v/v) inoculum of the seed culture. Preseeds were streaked on culture plates to check for homogeneity and possible contamination.

Seed cultures were grown in 400 mL of the above-described medium in 2 L baffled flasks in a reciprocal shaker at 125 rpm at 30° C. for two days. Seed cultures were blended and streaked as before to check for contamination before further use.

The following description is typical of laboratory production of bacterial cellulose. However, the process has been scaled up to fermentors as large as 20,000 L and the material used in the examples to follow has been produced in this larger equipment. There is no discernable difference in the product formed in small or commercial-size reactors.

A continuously stirred 14 L Chemap fermentor was charged with an initial 12 L culture volume inoculated with 5% (v/v) of the seed cultures. An initial glucose concentration of 32 g/L in the medium was supplemented during the 72-hour fermentor run with an additional 143 g/L added intermittently during the run. In similar fashion, the initial 2% (v/v) CSL concentration was augmented by the addition of an amount equivalent to 2% by volume of the initial volume at 32 hours and 59 hours. Cellulose concentration reached about 12.7 g/L during the fermentation. Throughout the fermentation, dissolved oxygen was maintained at about 30% air saturation.

Following fermentation, the cellulose was allowed to settle and the supernatant liquid poured off. The remaining cellulose was washed with deionized water and then extracted with 0.5M NaOH solution at 60° C. for 2 hours. After extraction, the cellulose was again washed with deionized water to remove residual alkali and bacterial cells. More recent work has shown that 0.1M NaOH solution is entirely adequate for the extraction step. The purified cellulose was maintained in wet condition for further use. This material was readily dispersible in water to form a uniform slurry.

The bacterial cellulose produced under stirred or agitated conditions, as described above, has a microstructure quite different from that produced in conventional static cultures. It is a reticulated product formed by a substantially continuous network of branching interconnected cellulose fibers.

The bacterial cellulose prepared as above by the agitated fermentation has filament widths much smaller than softwood pulp fibers or cotton fiber. Typically these filaments will be about 0.05–0.20 microns in width with indefinite length due to the continuous network structure. A softwood fiber averages about 30 microns in width and 2–5 mm in length while a cotton fiber is about half this width and about 25 mm long.

Reference should be made to U.S. Pat. No. 4,863,565 for additional details of bacterial cellulose production.

EXAMPLE 2

Viscosities of Fracturing Fluids with Bacterial Cellulose

Bacterial cellulose (BAC) has been shown in other aqueous fluid systems to impart thixotropic properties. The effect of bacterial cellulose on the viscosity of hydraulic fracturing fluids was determined using two different methods for measuring viscosity and at high and low shear rates. Low shear viscosities would be relevant during the fracture settling process while the high shear values would reflect the environment during the pumping process.

In this set of experiments the BAC was added in combination with different polymeric fracturing fluid gellants, specifically hydroxypropyl guar (HPG), carboxymethylhydroxypropyl guar (CMHPG), and hydroxyethyl cellulose (HEC). Ratios of polymer to BAC were varied using 20–40 lb/1000 gal (2.4–4.8 g/L) of polymer to 5–15 lb/1000 gal (0.60–1.8 g/L) of BAC. A preferred ratio was 40 pounds of the guar derivatives and 30 pounds of HEC, each with 10 pounds of BAC per 1000 gallons of fluid (4.8 or 3.6 g/L of polymer and 1.2 g/L BAC). The mixtures using water as solvent were prepared in a Waring Blendor for 20 minutes at a medium speed. It is known that BAC dispersions in water require shear energy in order to build viscosity. The viscosity of the resulting fluids was measured with a Brookfield Viscometer, Model RV, using a number 1 or 2 spindle at 0.3 rpm. This corresponds to a shear rate of $<20$ sec$^{-1}$. Brookfield Viscometers are available from Brookfield Engineering Laboratories, Inc., Stoughton, Mass. Measurements were made at temperatures of 80° and 150° F. (26.7° and 65.6° C.). Table 1 shows the significantly higher viscosities obtainable using BAC.

TABLE 1

| Polymer | lb/Mgal | Temp., °F. | Viscosity mPa.s |
| --- | --- | --- | --- |
| HPG | 40 | 80 | 390 |
| HPG | 40 | 150 | 160 |
| CMHPG | 40 | 80 | 250 |
| CMHPG | 40 | 150 | 125 |
| HPG + BAC | 40/10 | 80 | 1180 |
| HPG + BAC | 40/10 | 150 | 640 |
| CMHPG + BAC | 40/10 | 80 | 840 |
| CMHPG + BAC | 40/10 | 150 | 620 |
| HEC + BAC | 30/10 | 80 | 880 |
| HEC + BAC | 30/10 | 150 | 150 |

In a second experiment samples prepared as above were tested using a Fann 50 Viscometer with a standard bob rotating at 40, 80 and 120 rpm (shear rates of 68–200/sec). The viscosities were calculated at shear rates of 40, 170 and 511 sec$^{-1}$. Tests were made at 70°, 100°, 125°, and 150° F. (21.2°, 37.8°, 51.7°, and 65.6° C.). The Fann viscometer is available from Fann Instrument Co., Houston, Tex. Table 2 shows the results which indicate that at higher shear rates BAC reduces the apparent viscosity.

TABLE 2

| Polymer | lb/Mgal | Temp., °F. | Shear Rate 40/sec | 170/sec | 511/sec |
| --- | --- | --- | --- | --- | --- |
| HPG | 40 | 70 | 140 | 63 | 35 |
|  |  | 125 | 101 | 50 | 29 |
|  |  | 150 | 81 | 43 | 27 |
| HPG + BAC | 40/10 | 70 | 86 | 43 | 26 |
|  |  | 100 | 69 | 37 | 23 |
|  |  | 125 | 46 | 29 | 20 |
|  |  | 150 | 35 | 24 | 17 |
| CMHPG | 40 | 70 | 108 | 51 | 29 |
|  |  | 125 | 83 | 43 | 25 |
| CMHPG + BAC | 40/10 | 70 | 104 | 45 | 24 |
|  |  | 100 | 91 | 40 | 22 |
|  |  | 125 | 72 | 34 | 20 |
|  |  | 150 | 49 | 27 | 18 |
| HEC + BAC | 30/10 | 70 | 51 | 25 | 18 |
|  |  | 100 | 18 | 15 | 11 |
|  |  | 125 | 5 | 8 | 10 |

EXAMPLE 3

Proppant Transport Properties

The ability of gellant polymer/BAC systems to impede the settling of single sand grains was used as a measure of the proppant transport properties of the fluids made and studied in the previous example. Proppant settling was determined using 20–25 mesh Jordan Northern White sand at 80° and 150° F. (26.7° and 65.6° C.). Jordan sand is supplied by Unimin, New Canaan, Conn. The apparatus consisted of a graduated cylinder filled with the appropriate polymer suspension and placed in a constant temperature bath. Single sand grains were placed in the cylinder and observed until the settling velocity was constant. Several replicate tests were run at each condition. The results are given in Table 3. Results clearly indicate that with BAC in the transport fluid there is negligible sand settling.

TABLE 3

| Polymer | lb/Mgal | Temp., °F. | SGSS mm/min |
|---|---|---|---|
| HPG | 40 | 80 | 25 |
| HPG | 40 | 150 | 250 |
| CMHPG | 40 | 80 | 188 |
| CMHPG | 40 | 150 | 231 |
| HPG + BAC | 40/10 | 80 | 1.0 |
| HPG + BAC | 40/10 | 150 | 1.1 |
| CMHPG + BAC | 40/10 | 80 | 1.5 |
| CMHPG + BAC | 40/10 | 150 | 3.3 |
| HEC + BAC | 30/10 | 80 | 0.18 |
| HEC + BAC | 30/10 | 150 | 0.83 |

EXAMPLE 4

Methods of Viscosity Reduction

One of the important properties for oil well fracturing fluids to have is ease of breakdown of the polymer to reduce viscosity after the proppant is in place so as to allow facture cleanup and resumption of oil and/or gas flow. Oxidizers and enzymes are two of the most common methods for accomplishing this breakdown. The following tests were used to determine breakdown characteristics of the mixtures of 40 lb/1000 gal (2.4 g/L) of HPG and CMHPG with 10 lb/1000 gal (1.2 g/L) of BAC measured at temperatures of 100° and 150° F. (37.8° and 65.6° C.). The test procedure was to mix the viscosity breakers with the transport fluid in a Fann 35 cell, bring to temperature and monitor the viscosity over a 24 hour time period. In a first test calcium hypochlorite (65% available chlorine) was chosen as an example of an oxidizing breaker. The usual levels of this material are between 0.25 and 10 lb/1000 gal (0.030 and 1.2 g/L), most commonly in the neighborhood of about 0.5 to 1 lb/1000 gal (0.060 to 0.12 g/L). The initial viscosities of the gellant polymer/BAC suspensions was about 25 cp (25 mPa·s). Effective breakage was seen within 1 hour at a hypochlorite level of 1 lb/1000 gal (0.12 g/L).

A second set of tests was run using the enzyme Celluclast, available from Novo Laboratories, Inc, Franklinton, N.C., at a usage of 0.05 gal/1000 gal (0.05 mL/L). Recommended usages fall within the range of 0.02 to 8 gal/1000 gal (0.05 to 8 mL/L).

The target viscosity for the treated fluids was as low as possible and at least under about 10 mPa·s. Data for both the oxidizer and enzymatic tests are given in Table 4. The target viscosity was reached for all systems in no longer than 6 hours.

TABLE 4

| | Temperature = 100° F. | | | |
|---|---|---|---|---|
| | Viscosity, mPa·s | | | |
| | Hypochlorite @ 1 lb/Mgal | | Celluclast @ 0.05 gal/Mgal | |
| Time, hrs | HPG/BAC | CMHPG/BAC | HPG/BAC | CMHPG/BAC |
| 0 | 25 | 25 | 25 | 25 |
| 1 | 11 | 9 | 11 | 13 |
| 2 | 11 | 8 | 8 | 11 |
| 4 | 11 | 8 | 5 | 7 |
| 6 | 10 | 8 | 4 | 7 |
| 24 | 10 | 8 | 1 | 3 |

| | Temperature = 150° F. | | | |
|---|---|---|---|---|
| | Viscosity, mPa·s | | | |
| Time, hrs | Hypochlorite @ 1 lb/Mgal | | Celluclast @ 0.05 gal/Mgal | |
| | HPG | CMHPG | HPG | CMHPG |
| 0 | 25 | 25 | 25 | 25 |
| 1 | 6 | 4 | 3 | 5 |
| 2 | 6 | 4 | 1 | 3 |
| 4 | 6 | 3 | 1 | 3 |
| 6 | 5 | 3 | 1 | 1 |
| 24 | 4 | 3 | 1 | 1 |

EXAMPLE 5

Formation Fracture Simulation

Computer simulations were run on several gellant polymer and polymer BAC combinations to estimate fracture geometry and production ratio increases. The program used (FRACANAL) takes into account fluid leakoff, temperature gradients in the well, rheology of the stimulation fluid, pumping schedule, and expected pressures in the well. Results are shown in Table 5.

The BAC containing fluids have a much higher predicted production increase than the base polymers. This is due to the anticipated BAC-containing fluids to create long fractures and to distribute the proppant throughout most of the fracture zone.

| System lb/lb | Created Length, ft/m | Propped Length, ft/m | Production Increase Ratio |
|---|---|---|---|
| HPG 40/0 | 845/258 | 325/99 | 3.5 |
| HPG + Ti 40/0 | 763/233 | 261/80 | 3.1 |
| HPG/BAC 40/10 | 1296/395 | 994/304 | 6.7 |
| CMHPG 40/0 | 929/283 | 418/127 | 3.8 |
| CMHPG/BAC 40/10 | 1191/363 | 771/235 | 5.5 |
| HEC/BAC 30/10 | 1281/390 | 1124/343 | 7.9 |

EXAMPLE 6

Friction Simulation Tests

Flow friction simulation tests were conducted by circulating a hydraulic fracturing fluid without added proppant through a 20 ft (6.1 m) length of ⅜ in (9.5 mm) of stainless steel tubing using a Jaeco Intensifier pump. Pressure drop across the tubing loop was measured at various pumping rates. The addition of BAC to a number of conventional gellants has been shown to result in a very significant reduction in flow friction. Gellant solutions were made up as shown in Table 6 and results compared to a system using water only. In all cases a 60+% friction reduction was achieved by the BAC/polymer system with no additional friction reducers.

TABLE 6

| System | Friction Reduction, % |
|---|---|
| 40 lb CMHPG + 10 lb BAC | 68% |
| 30 lb HEC + 10 lb BAC | 62 |
| 15 lb CMHEC + 5 lb BAC | 61 |
| 40 lb HPG + 10 lb BAC | 60 |

It will be readily apparent that many departures can be made from the embodiments shown in the examples while still remaining within the general scope of the invention. Thus, the invention should be considered as being limited only as it is defined in the following claims.

We claim:

1. A method of preparing a hydraulic fracturing fluid composition which comprises:
   providing an aqueous transport medium;
   increasing the viscosity of the medium by dispersing sufficient amounts of a gellant and a bacterial cellulose in said medium, said bacterial cellulose being produced by a cellulose generating strain of the genus Acetobacter grown in an agitated culture; and then
   suspending a sufficient amount of proppant particles in said medium whereby said bacterial cellulose decreases the settling rate of the proppant particles prior to and during transport into a drill hole and fractured geologic formation.

2. The method of claim 1 in which said Acetobacter strain is selected from one resistant to mutation to non-cellulose producing types under agitated culturing conditions.

3. The method of claim 1 in which the bacterial cellulose is present in an amount of about 1–40 lb/1000 gal (0.12–4.8 g/L) of fracturing fluid.

4. The method of claim 3 in which the bacterial cellulose is present in an amount of about 5–15 lb/1000 gal (0.60–1.8 g/L) of fracturing fluid.

5. The method of claim 1 in which the gellant is selected from the group consisting of guar, hydroxypropyl guar, carboxymethylhydroxypropyl guar, xanthan, hydroxyethyl cellulose, carboxymethylhydroxyethyl cellulose, hydroxypropylmethyl cellulose and mixtures thereof in an amount of about 5–60 lb/1000 gal (0.60–7.2 g/L) of fracturing fluid.

6. The method of claim 5 in which the gellant is present in an amount of about 20–50 lb/1000 gal (2.4–6.0 g/L) of fracturing fluid.

7. The method of claim 4 in which the gellant is hydroxypropyl guar.

8. The method of claim 1 in which the gellant is carboxymethylhydroxypropyl guar.

9. The method of claim 1 in which the gellant is hydroxyethyl cellulose.

10. A hydraulic fracturing fluid composition comprising:
    an aqueous transport medium;
    a gellant and a bacterial cellulose dispersed in said medium to raise the viscosity thereof, said bacterial cellulose being produced by a cellulose generating strain of the genus Acetobacter in an agitated culture; and
    a sufficient amount of proppant particles suspended in said medium whereby said bacterial cellulose decreases the settling rate of the proppant particles prior to and during transport into a drill hole and fractured geologic formation.

11. The composition of claim 10 in which said Acetobacter strain is selected from one resistant to mutation to non-cellulose producing types under agitated culturing conditions.

12. The composition of claim 10 in which the bacterial cellulose is present in an amount of about 1–40 lb/1000 gal (0.12–4.8 g/L) of fracturing fluid.

13. The composition of claim 12 in which the bacterial cellulose is present in an amount of about 5–15 lb/1000 gal (0.60–1.8 g/L) of fracturing fluid.

14. The composition of claim 10 in which the gellant is selected from the group consisting of guar, hydroxypropyl guar, carboxymethylhydroxypropyl guar, xanthan, hydroxyethyl cellulose, carboxymethylhydroxyethyl cellulose, hydroxypropylmethyl cellulose and mixtures thereof in an amount of about 5–60 lb/1000 gal (0.60–7.2 g/L) of fracturing fluid.

15. The composition of claim 14 in which the gellant is present in an amount of about 20–50 lb/1000 gal (2.4–6.0 g/L) of fracturing fluid.

16. The composition of claim 10 in which the gellant is hydroxypropyl guar.

17. The composition of claim 10 in which the gellant is carboxymethylhydroxypropyl guar.

18. The composition of claim 10 in which the gellant is hydroxyethyl cellulose.

19. The composition of claim 10 in which the proppant is present in an amount of about 1–8 lb/gal (120–960 g/L).

* * * * *